United States Patent
Coutinho et al.

(10) Patent No.: US 12,486,619 B2
(45) Date of Patent: Dec. 2, 2025

(54) MEMBRANE SEPARATION PROCESS FOR VINYLAMINE-CONTAINING POLYMERS

(71) Applicant: SOLENIS TECHNOLOGIES, L.P., Wilmington, DE (US)

(72) Inventors: Cecil Coutinho, Wilmington, DE (US); Sachin Borkar, Wilmington, DE (US); Shantanu Nikam, Wilmington, DE (US)

(73) Assignee: SOLENIS TECHNOLOGIES, L.P., Wilmington, DE (US)

(*) Notice: Subject to any disclaimer, the term of this patent is extended or adjusted under 35 U.S.C. 154(b) by 295 days.

(21) Appl. No.: 18/173,107

(22) Filed: Feb. 23, 2023

(65) Prior Publication Data

US 2024/0287742 A1 Aug. 29, 2024

(51) Int. Cl.
*D21H 17/07* (2006.01)
*B01D 61/02* (2006.01)
*B01D 61/14* (2006.01)
*B01D 61/58* (2006.01)
*B01D 69/02* (2006.01)
*C07C 209/86* (2006.01)
*C08F 26/02* (2006.01)
*D21H 21/10* (2006.01)

(52) U.S. Cl.
CPC .......... *D21H 17/07* (2013.01); *B01D 61/027* (2013.01); *B01D 61/145* (2013.01); *B01D 61/58* (2013.01); *B01D 69/02* (2013.01); *C07C 209/86* (2013.01); *C08F 26/02* (2013.01); *D21H 21/10* (2013.01); *B01D 2311/08* (2013.01); *B01D 2325/20* (2013.01)

(58) Field of Classification Search
CPC ....... C08F 26/02; C07C 209/86; B01D 61/58; B01D 69/02; B01D 61/027; B01D 61/145; D21H 21/10; D21H 17/07; D21H 17/56

See application file for complete search history.

(56) References Cited

U.S. PATENT DOCUMENTS

| | | | |
|---|---|---|---|
| 6,716,311 B1 * | 4/2004 | Decker | C08G 73/0206 528/370 |
| 7,902,312 B2 | 3/2011 | Gu et al. | |
| 7,932,349 B2 | 4/2011 | Riehle et al. | |
| 8,101,710 B2 | 1/2012 | Riehle et al. | |
| 8,158,005 B1 * | 4/2012 | Gupta | C02F 1/725 210/748.14 |
| 8,518,215 B2 | 8/2013 | McKay et al. | |
| 9,120,952 B2 * | 9/2015 | Gupta | C09K 3/1463 |

(Continued)

FOREIGN PATENT DOCUMENTS

| | | |
|---|---|---|
| EP | 1424123 A1 | 6/2004 |
| WO | 2003078037 A1 | 9/2003 |

(Continued)

*Primary Examiner* — Dennis R Cordray
(74) *Attorney, Agent, or Firm* — Ingrassia Fisher & Lorenz, LLP

(57) ABSTRACT

Provided is a method for the removal of salts and by-products from vinylamine-containing polymers. In particular, the method allows the removal of unwanted salts, by-products, spent initiators and short chain vinylamine-containing polymers while retaining the functional, higher molecular weight polymers that provide for desired product performance.

9 Claims, 2 Drawing Sheets

(56) References Cited

U.S. PATENT DOCUMENTS

| | | | | |
|---|---|---|---|---|
| 2006/0065599 A1* | 3/2006 | Bennett | ................. | C08F 6/06 |
| | | | | 210/639 |
| 2013/0118699 A1* | 5/2013 | Borkar | ................. | D21H 17/37 |
| | | | | 977/773 |
| 2015/0299961 A1 | 10/2015 | Borkar et al. | | |
| 2016/0298297 A1 | 10/2016 | Borkar et al. | | |
| 2024/0263397 A1* | 8/2024 | Petty, II | ............... | D21H 17/375 |
| 2024/0287742 A1* | 8/2024 | Coutinho | ............... | C08F 26/02 |

FOREIGN PATENT DOCUMENTS

| | | | |
|---|---|---|---|
| WO | 2004085041 A1 | 10/2004 | |
| WO | 2010090889 A2 | 8/2012 | |

* cited by examiner

MEMBRANE SEPARATION PROCESS FOR VINYLAMINE-CONTAINING POLYMERS

TECHNICAL FIELD

The present disclosure generally relates to the removal of salts and by-products from vinylamine-containing polymers. In particular, the method allows the removal of salts, by-products, and low molecular weight vinylamine-containing polymers while retaining the functional, higher molecular weight polymers that provide desired product performance. Also provided is a method of increasing the high molecular weight fraction of a vinylamine-containing polymer solution.

BACKGROUND

Many approaches have been developed to improve performance of vinylamine-containing polymers including synthesis of high molecular weight polymer, optimizing charge density, removing impurities, increasing solids etc. These optimizations help to reduce usage of the vinylamine-containing polymers in the paper making process. Other practices include the modification of the synthesis steps to reduce the amount of impurity produced—but this can have unintended consequences on the quality of the vinylamine-containing polymer and its associated functionality.

The team has explored pathways that involve the use of activated media to filter these salts, by-products, and low molecular weight vinylamine-containing polymers while retaining the functional, higher molecular weight polymers that provide desired product performance, but it was not practical on a commercial scale due to pressure drop, yield loss and efficacy. Ongoing efforts are underway to develop a new synthetic approach to produce new dry strength polymers, but these efforts are aimed towards next generation products. Overall, using membranes to remove impurities is a simple and highly effective technique with strong commercial interest and immediate implementation via readily available technology.

Membranes have been used to remove dissolved solids from water since the 1950's. It is a mechanical separation process, whereby the membrane acts as a selective barrier allowing relatively free passage of one component while retaining another. Liquid membrane separation is classified by the molecular weight cut-off (MWCO) when describing the various membranes. For example, membranes used in reverse osmosis (RO) generally have an MWCO of <100 Dalton (Da), nanofiltration (NF) 100-5,000 Da), ultrafiltration (UF) 5,000-500,000 Da), and microfiltration (MF) >5,000,000 Da). The removal of salts and by-products process falls within the NF regime. Vibratory shear membranes in a diafiltration configuration can be used to achieve higher viscosity and solids target for the final product.

Using membranes with increasing MWCO (within the ultrafiltration regime) enables the removal of salts, by-products, and low molecular weight polymers that do not contribute significantly to the overall product performance. The new product has shown superior performance on an equal dosage basis. As used herein, the term molecular weight, is based on the weight average molecular weight of the polymer.

BRIEF SUMMARY

Provided is a method of processing a solution of vinylamine-containing polymers. In particular, the method includes providing a solution of vinylamine-containing polymer; circulating the solution through a nanofiltration membrane and/or an ultrafiltration membrane thereby separating the vinylamine-containing polymer or retentate from residual impurities such as, salts, by-products, and/or lower molecular weight vinylamine-containing polymers from the higher molecular weight polymers; and collecting the polyvinylamine retentate having reduced levels of impurities.

Also provided is a method of obtaining higher molecular weight vinylamine-containing polymer solutions. In particular, the method includes providing a vinylamine-containing polymer solution that includes a low molecular weight vinylamine-containing polymer component and a high molecular weight vinylamine-containing component; circulating the solution through a nanofiltration membrane and/or an ultrafiltration membrane thereby separating the higher molecular weight vinylamine-containing polymer or retentate from lower molecular weight component from the higher molecular weight component and also from salts, by-products and/or low molecular weight polymers. The collected retentate having a higher weight average molecular weight than prior to the filtration process. This also provides for increased actives when compared with a vinylamine-containing polymer that was not circulated through a nanofiltration membrane and/or an ultrafiltration membrane.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The present disclosure will hereinafter be described in conjunction with the following drawing figures, wherein like numerals denote like elements, and wherein.

DETAILED DESCRIPTION

Figure 1:
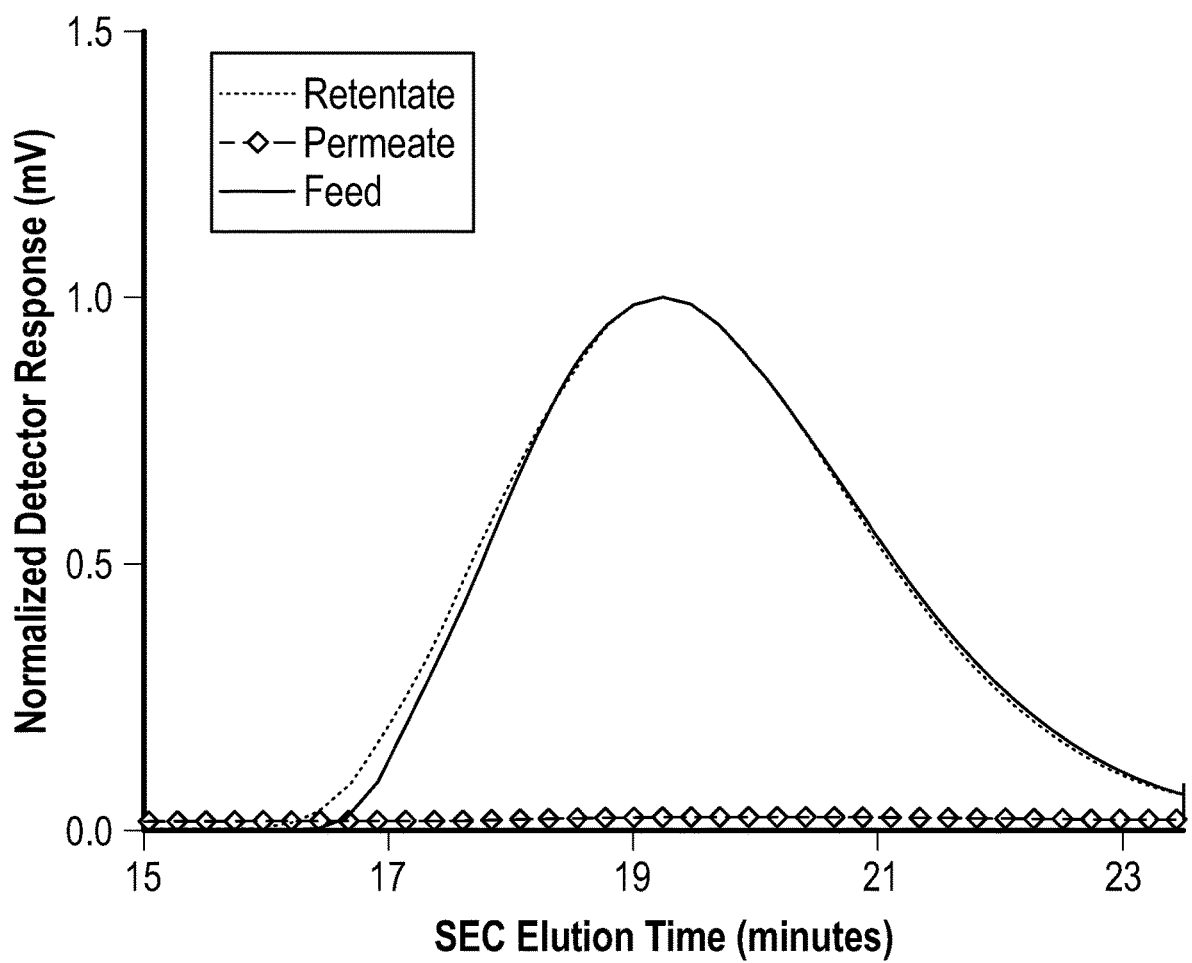
FIG. 1, illustrates through polymer chromatography that little (functional) polymer is lost in the permeate stream: most of the polymer is retained in the retentate stream with negligible loss in molecular weight.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Unless specifically stated or obvious from context, as used herein, the term "about" is understood as within a range of normal tolerance in the art, for example within 2 standard deviations of the mean. "About" can be understood as within 10%, 5%, 1%, 0.5%, 0.1%, 0.05%, or 0.01% of the stated value. "About" can alternatively be understood as implying the exact value stated. Unless otherwise clear from the context, all numerical values provided herein are modified by the term "about."

Provided is a method of processing a solution of vinylamine-containing polymer. As a result, the solution has reduced levels of salts and by-products of the vinylamine-containing polymers. The method comprises providing a solution of vinylamine-containing polymer; circulating the solution through a nanofiltration membrane and/or an ultrafiltration membrane thereby producing a vinylamine-containing retentate. Circulating the solution through the membrane(s) results in separating the vinylamine-containing polymer or retentate from residual impurities, such unwanted reaction salts, small proteins, organic and/or inorganic compounds and solvents, residual monomers, monomeric impurities, monomer decomposition byproducts, monomer stabilizers, byproducts from initiator decomposition, and/or impurities coming from post polymerization modification process or raw materials. The collected vinylamine-containing retentate has reduced levels of salts and by-products. In addition, the retentate will contain a higher average molecular weight vinylamine-containing polymer fraction than the solution prior to any filtration process.

In some aspects of the method, the solution of vinylamine-containing polymer further comprises one or more of a salt or a by-product formed during vinylamine containing polymer synthesis and or modification of vinylamine containing polymer. The solution is circulated through the nanofiltration membrane and/or ultrafiltration membrane resulting in separating the vinylamine-containing polymer retentate from at least a portion of the salts and/or a by-product and the retentate collected.

In other aspects of the method, collected retentate has a reduced amount of salts and/or a by-product as compared to the solution prior to circulating through the nanofiltration membrane and/or an ultrafiltration membrane.

In other aspects of the method, the salts and/or by-products are chosen from unwanted reaction salts, proteins, solvents, monomeric impurities, monomer decomposition by-products, monomer stabilizers, by-products from initiator decomposition, and/or cationizing and/or alkylating agent containing amine or amide functionality. The salts and/or by-products can be monomeric impurities.

In yet other aspects of the method, the vinylamine-containing polymer retentate has a higher concentration of vinylamine-containing polymer than the solution prior to circulating through the nanofiltration membrane and/or an ultrafiltration membrane.

In some aspects of the current method, the nanofiltration membrane has an MWCO of about 100 Dalton to about 5,000 Da, or about 200 to about 2,000, or from about 500 to about 1,000, and can be 800 Da. In some aspects of the method, the ultrafiltration membrane has an MWCO of about 5000 Dalton to about 500,000 Da, or about 6000 to about 50,000, or from about 7000 to about 20,000, and can be 10,000 Da.

In some aspects of the method, the salts and by-products are impurities, for example, from reactions involving N-vinylformamide polymerization and copolymerization with other functional monomers, hydrolysis of polyvinylformamide by acid or caustic treatment, and post polymerization modification of vinylamine-containing polymers with functional monomers.

Also provided is a method of increasing actives of a vinylamine-containing polymer solution comprising providing a solution of vinylamine-containing polymer; circulating the solution through a nanofiltration membrane and/or an ultrafiltration membrane thereby separating the vinylamine-containing polymer or retentate from salts and by-products; and collecting the retentate having reduced salts and by-products.

It was found that through careful selection of the membrane that removal of impurities could be accomplished with no loss of functional polymer or degradation of polymer (see Table 1). This was seen despite the membrane processing environment which includes shear points from the pump, valves, and vibrating membrane surfaces (VSEP systems). As seen in the examples below; there is negligible loss in functionality of the polymer and its properties.

In some aspects of the method, a solution of vinylamine-containing polymers having reduced levels of residuals including salts and by-products, such as permeable molecules, unwanted reaction salts, small proteins, organic and/or inorganic compounds and solvents, residual monomers, monomeric impurities, monomer decomposition byproducts, monomer stabilizers, and byproducts from initiator decomposition, and/or impurities from the post polymer modification of vinylamine-containing polymers using functional monomers (see Table 2).

In some aspects of the method, the salts and by-products include but are not limited to impurities or unwanted salts from polyvinylamine-based reactions and post polymer modification wherein a vinylamine-containing polymer is modified by Michael adduct formation or cationized by an alkylating agent that has amine or amide functionality.

In other aspects of the method, salts and by-products are removed by increasing the diafiltration steps, i.e. a dilution process that involves removal or separation of components as shown in Table 2.

In some aspects of the method, more porous membranes can be used, which allows for the development of a higher weight average molecular weight of the vinylamine-containing products collected as retentate. In some aspects of the method, the retentate collected after being circulated through the nanofiltration and/or ultrafiltration membranes can be added to a paper furnish in a papermaking process to help improve drainage.

Also provided is a method of preparing a solution of high molecular weight vinylamine-containing polymers thus improving drainage in, for example, a papermaking process wherein the papermaking furnish is treated with the higher active, higher molecular weight polyvinylamine retentate collected from the filtration step as described above. The polyvinylamine based solutions can be put through additional filtration steps to provide the desired purity of the solution.

The method includes providing a solution of vinylamine-containing polymer comprising a low molecular weight vinylamine polymer component and a high molecular weight vinylamine polymer component. The solution is circulated through a nanofiltration and/or ultrafiltration membrane having an MWCO of about 10,000 Da thereby separating a fraction of low molecular weight vinylamine-containing polymer from a fraction of high molecular weight vinylamine-containing polymer. The fraction of higher molecular weight is collected and can be used accordingly.

The collected fraction of the higher molecular weight polymer or retentate, can be circulated through additional membranes depending on the desired molecular weight to be obtained.

Higher weight average molecular weight products were found to provide better performance as shown in the drainage data found in Tables 2 and 3. For Example, increasing the MWCO of the membrane by using ultrafiltration membranes of about 10,000 Da, a low molecular weight fraction of the functional polymer can be separated from the higher molecular weight polymer. The definition of a lower and higher molecular weight polymers is relative to the MWCO of the membrane being used in the filtration system. For example, higher molecular weight polymer collected as the retentate can be considered polymer with weight average molecular weight of from about 10,000 Da to about 1,000,000 Da. can be from about 20,000 Da to about 750,000 Da, can be from about 50,000 Da. to about 400,000, and be from about 100,000 Da. to about 250,000 Dalton.

In essence, the present process removes a portion of lower molecular weight polymer through membrane selection thereby providing a solution having a higher weight average than the original solution, which in turn has higher efficacy (demonstrated by drainage studies) on an equal active basis.

Using membrane technology, the percentage of active polymers can be increased beyond the starting product, thereby creating a product that is substantially purer and more valuable.

EXAMPLES

The present disclosure is now illustrated by the following non-limiting examples. It should be noted that various changes and modifications may be applied to the following examples and processes without departing from the scope of this invention, which is defined in the appended claims. Therefore, it should be noted that the following examples should be interpreted as illustrative only and not limiting in any sense.

Example 1

For membrane separation, a V-SEP series L unit with NP010 (polyethersulfone, nominal 800 Dalton cut off) membrane was used. Both were available from New Logic Research, Minden, NV. The detailed procedures for this equipment are in the operating manual provided by New Logic Research. An external heat exchanger was used to maintain the target temperature, typically 25° C. to 45° C. The starting feed was diluted to 10.0% total solids with water to give a 10 kg of solution. The V-SEP unit was started, and the flow rate was adjusted to 0.5 gal/min. The operating pressure was set to 200 p.s.i. by adjusting pump speed and the back-pressure valves. The temperature was maintained at 25° C. to 45° C. The total solids of the retentate and the permeate were monitored during the process to confirm the process was functioning properly (e.g., no leak in the membrane) and to provide performance guidance. Permeate was removed to concentrate the retentate to 17.5% total solids. The average flux was calculated to be 11.2 gallons/sq-feet/day. Samples of the retentate and permeate were collected and conductivity, pH, % solids, and amount recovered determined (see Table 1).

The drainage activity of the current method was determined utilizing a Dynamic Drainage Analyzer, test equipment available from AB Akribi Kemikonsulter Sundsvall, Sweden. A 750 milliliter (ml) sample volume at 0.9% consistency and a 0.500 mm opening/0.25 mm thread (32-mesh screen) were used in these tests. The test device applied a 300-mbar vacuum to the bottom of the separation medium and the time between the application of vacuum and the vacuum break point electronically measured, i.e. the time at which the air/water interface passes through the thickening fiber mat.

Drainage testing was performed using paper pulp that was 100% American OCC recycled medium with 50 parts-per-million (ppm) hardness, 25 ppm alkalinity, 2.5% GPC D15F oxidized starch (Grain Processing Corp., Muscatine, Iowa) and about 2000-2100 µS/cm conductivity. The system pH was 7.0 and the pulp freeness was about 350-400 CSF for the recycled medium.

A drainage index (DI) can be calculated as the drainage time for the control system with no additives divided by the time it takes for the system with additives. Therefore, a higher DI demonstrates an improvement in drainage (see Table 2 and Table 3).

As demonstrated by the drainage tests, the performance of the collected retentate supersedes that of the original product allowing for the differentiation of the present product from current commercial products.

Through the careful selection of the membrane, one can remove undesired salts and by-products with no loss of functional polymer (see Table 1). For example, a nanofiltration membrane (~800 Da) shows negligible loss of polymer in the permeate stream. Despite the membrane processing environment which includes shear points from the pump, valves, and vibrating membrane surface (VSEP systems), there is negligible loss in functionality of the polymer and its properties.

Example 2

Polymer chromatography was conducted using an Agilent 1260 with RI detection that was fitted with Shodex LB-806-M columns. The mobile phase used with the sample was 0.5M acetic acid and 0.2 M lithium nitrate. The flow rate through the column was 0.5 ml/min and the resulting signal compared against Agilent Easivial PEG/PEO standards to determine the molecular weight distribution.

An LC/MS/MS using dynamic multiple reaction monitoring was used for quantification of the APTAC related impurities. The product and each successive diafiltration product were filtered through a 1K MWCO membrane and the filtrate used in the LC/MS/MS instrument.

TABLE 1

Physical properties of polymer before and after membrane filtration

| Sample | Conductivity | pH | % Solids | Recovery |
|---|---|---|---|---|
| Diluted Polymer Solution | 49.811 µS/cm | 8.4 | 10.09 | 100 |
| VSEP Composite Permeate | 49.911 µS/cm | 8.6 | 5.57 | 61.5 |
| VSEP Final Concentrate | 49.822 µS/cm | 8.6 | 17.62 | 38.5 |

TABLE 2

Drainage Index

| | Drainage Index | |
|---|---|---|
| Polymer Dosage (wt. %)* | Vinylamine Containing Product (Regular) | Vinylamine Containing Product (Membrane with MWCO 1K) |
| Blank | 100.0 | 100.0 |
| 0.025 | 102.4 | 104.0 |
| 0.05 | 134.9 | 139.5 |
| 0.1 | 198.2 | 195.0 |

*active product versus dry pulp

As can be seen in Table 2, it is possible to prepare polyvinylamine solutions having reduced levels of salts and side-products with equivalent properties.

In addition, it can be seen in FIG. 1, that little (functional) polymer is lost in the permeate stream while most of the polymer is retained in the retentate stream with negligible loss in molecular weight.

As can be seen in Table 3, it is possible to prepare polyvinylamine solutions having reduced levels of salts and side-products, which provides for improved properties.

TABLE 3

| | Drainage Index | |
|---|---|---|
| Polymer Dosage (wt. %)* | Vinylamine Containing Product (Regular) | Vinylamine Containing Product (Membrane with MWCO 10K) |
| Blank | 100.0 | 100.0 |
| 0.025 | 124.2 | 132.3 |
| 0.05 | 176.4 | 192.0 |
| 0.1 | 206.9 | 232.4 |

*active product versus dry pulp

Example 3

Additional drainage testing was done in which a sample solution of functionalized vinylamine containing polymer was subjected to successive diafiltrations.

TABLE 4

| Monomeric-based Residuals after a First and Second Diafiltration | | |
|---|---|---|
| | Feed | $1^{st}$ Diafiltration | $2^{nd}$ Diafiltration |
| Monomeric residuals (PPB) | 10094 | 4383 | 3044 |

Results obtained via LC/MS/MS can be seen in Table 4, which indicate a decrease in monomeric based residuals after successive diafiltration volumes.

Example 4

Figure 2:
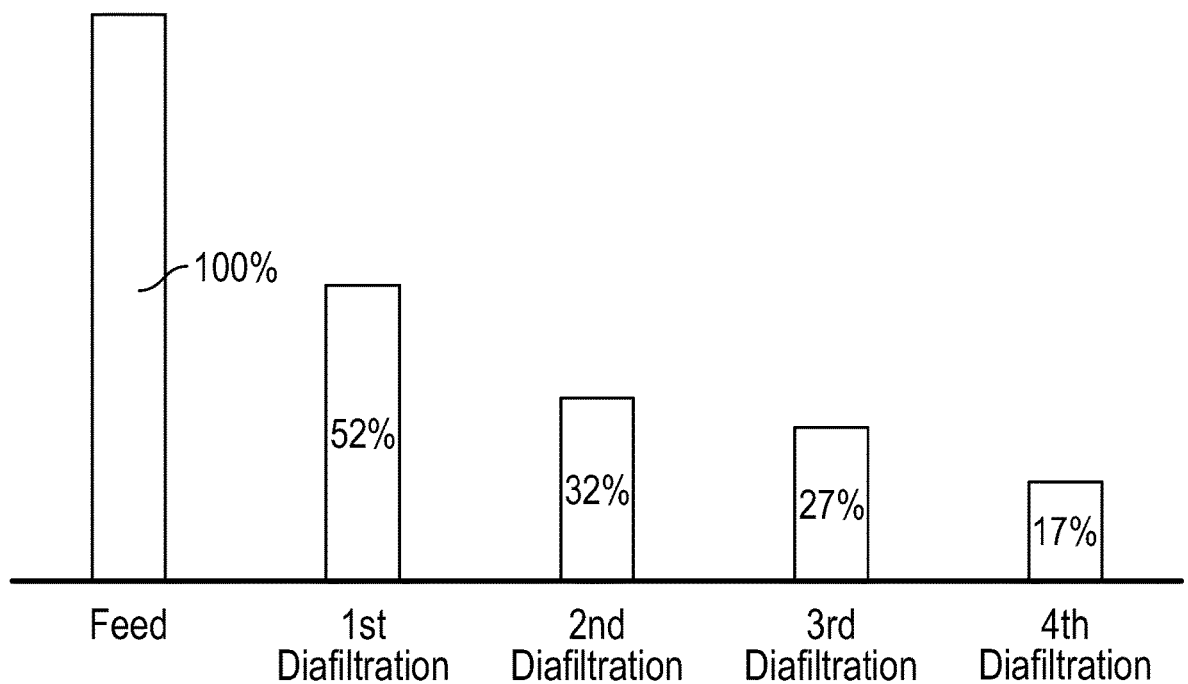
FIG. 2, is a plot showing a decrease in residuals after successive diafiltration steps measured via polymer chromatography and calculating a simple mass balance around the diafiltration steps.

In the following study, a 25 wt. % solution of functionalized vinylamine containing polymer was prepared, and the solution filtered through a nanofiltration membrane having a MWCO of 800 Da. The retentate was collected and the active polymer to salt ratio was measured using polymer chromatography. Result showed an increase in the amount of active polymer/salt ratio in the retentate as shown in FIG. 2.

In addition to the advantages of this technology discussed above, these studies have shown that it is possible to prepare polyvinylamine solutions having reduced levels of by-products and side-products. Increasing the diafiltration steps and/or volume increases the total amount of residual removed. Salts can also be removed in this membrane process. Increasing the diafiltration steps and/or volume increases the total amount of salt removed. Via diafiltration, residual monomer and byproducts from initiator decomposition are also removed and increasing the diafiltration steps, also results in residual monomer and byproducts from initiator decomposition being removed.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A method of removing salts, by-products, and low molecular weight polymers from a solution of vinylamine-containing polymer comprising;
   providing the solution of vinylamine-containing polymer, wherein the polymer comprises salts and by-products formed during vinylamine-containing polymer synthesis and/or modification of a vinylamine-containing polymer solution;
   circulating the solution through a nanofiltration membrane and/or an ultrafiltration membrane having a molecular cutoff of from about 500 Dalton to 1,000 Dalton, thereby separating a low molecular weight from a high molecular weight retentate of the vinylamine-containing polymer and at least a portion of the salts and by-products; and
   collecting a vinylamine-containing polymer retentate having a weight average molecular weight of from about 10,000 to about 1,000,000 Da. and a reduced amount of salts and by-products as compared to the solution prior to circulating through the nanofiltration membrane and/or an ultrafiltration membrane.

2. The method according to claim 1, wherein the salts and by-products are permeable molecules, unwanted reaction salts, small proteins, organic and/or inorganic solvents, residual monomers, monomeric impurities, monomer decomposition byproducts, monomer stabilizers, and byproducts from initiator decomposition, and/or impurities coming from cationizing and/or alkylating agent containing amine or amide functionality.

3. The method according to claim 2, wherein the salts and by-products are monomeric impurities.

4. The method according to claim 1, wherein the salts and by-products are impurities from reactions involving N-vinylformamide polymerization and copolymerization with other functional monomers, hydrolysis of polyvinylformamide by acid or caustic treatment, and post polymerization modification of vinylamine-containing polymers with functional monomers.

5. The method of claim 1, wherein collecting the vinylamine-containing polymer retentate comprises collecting the vinylamine-containing polymer retentate having a higher concentration of vinylamine-containing polymer than the solution prior to circulating through the nanofiltration membrane and/or an ultrafiltration membrane.

6. The method according to claim 1, wherein the nanofiltration membrane and/or an ultrafiltration membrane has a molecular weight cut-off of 800 Da.

7. A method of improving drainage in a papermaking process comprising adding the retentate according to claim 1, to a papermaking furnish.

8. A method of preparing a solution of high molecular weight vinylamine-containing polymers comprising,
provided a solution of vinylamine-containing polymer wherein the polymer comprises one or more of a salt or a by-product formed during vinylamine-containing polymer synthesis and/or modification of vinylamine containing polymer comprising a low molecular weight vinylamine polymer component and a high molecular weight vinylamine polymer component;
circulating the solution through a nanofiltration and/or ultrafiltration membrane having a molecular weight cut-off of from about 500 Dalton to 1000 Dalton, thereby separating a fraction of low molecular weight vinylamine-containing polymer from a retentate having a weight average molecular weight of from about 10,000 to about 1,000,000 Da.; and
collecting the retentate of the higher molecular vinylamine containing polymer, wherein the weight average molecular weight of the collected fraction of the higher molecular vinylamine-containing polymer is from about 10,000 to about 1,000,000 Da.

9. The method according to claim 8, wherein the weight average molecular weight of the collected fraction of vinylamine-containing polymer retentate is from about 100,000 to about 250,000 Da.

\* \* \* \* \*